United States Patent Office 2,848,248
Patented Aug. 19, 1958

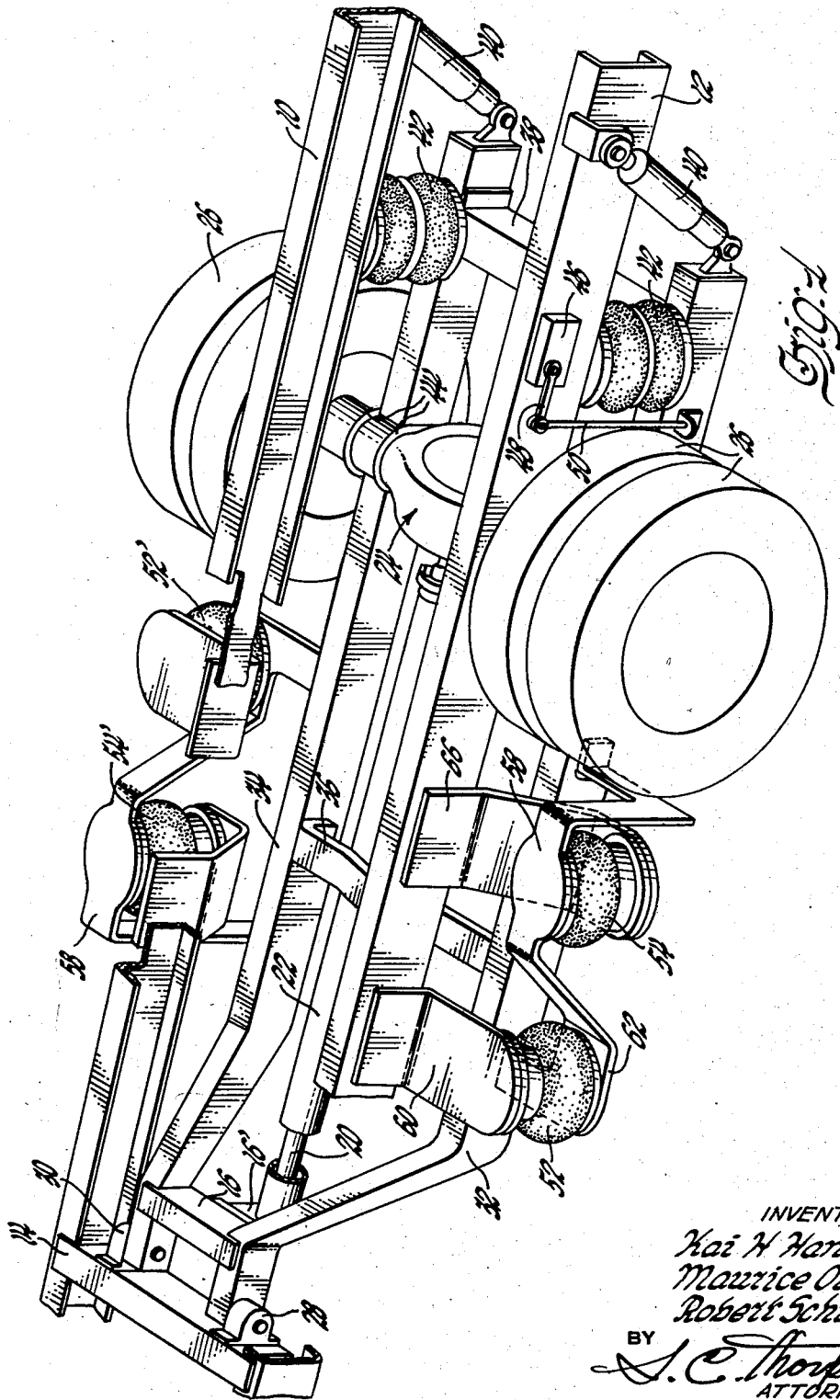

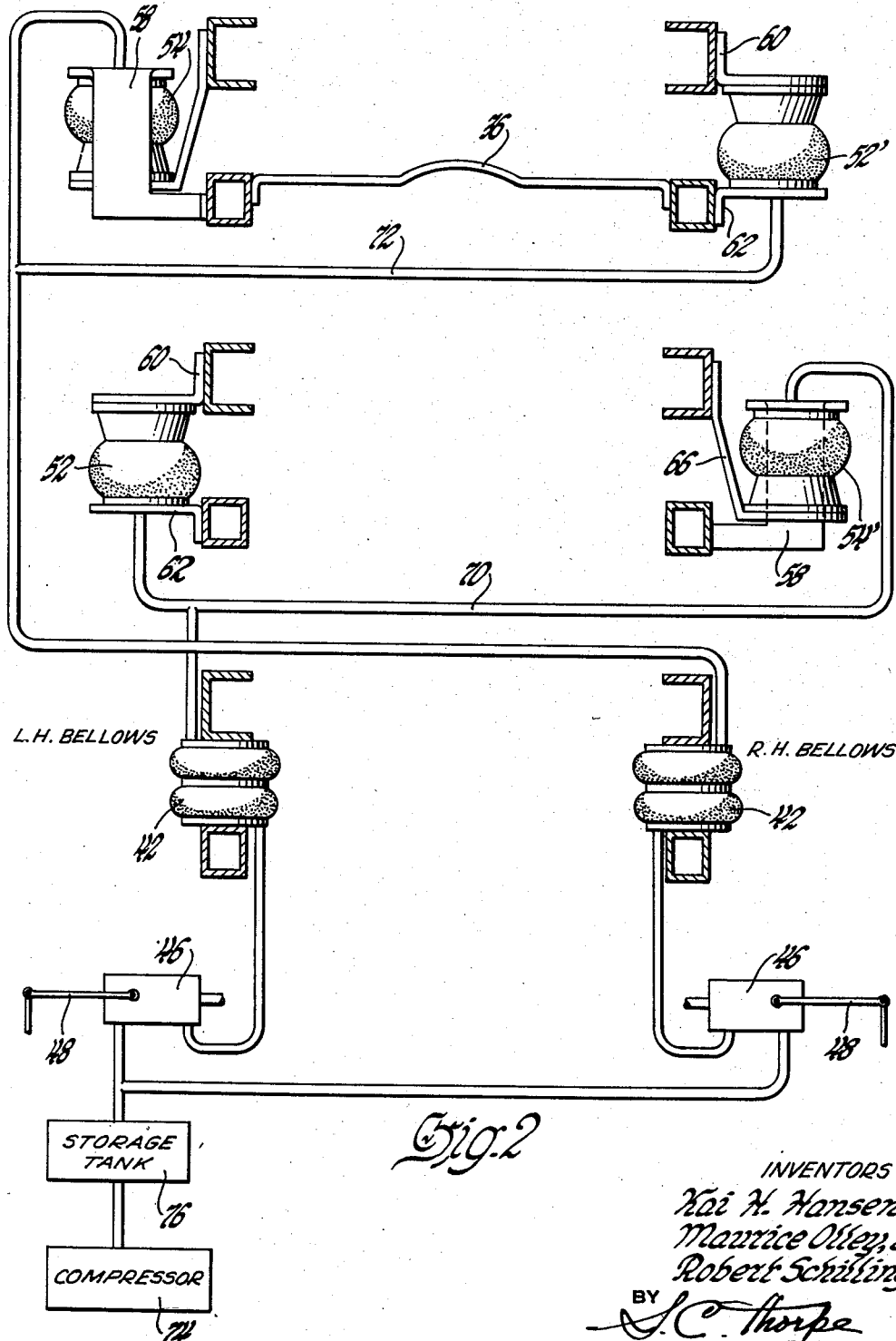

2,848,248
ANTI-ROLL SCHEME

Kai H. Hansen and Maurice Olley, Detroit, and Robert Schilling, Bloomfield Hills, Mich., assignors to General Motors Corporation, Detroit, Mich., a corporation of Delaware Application February 20, 1956, Serial No. 566,478

5 Claims. (Cl. 280—124)

This invention relates to a suspension system for automotive vehicles wherein the elastic components are containers supplied with fluid under a pressure corresponding to the load on the axles or equivalent parts. In its more particular aspect the invention is concerned with such a suspension system in which the containers have the form of rubber bags confining a gas, normally air, as the fluid medium.

The system herein is particularly distinguished in that it comprises in addition to air or equivalent fluid springs, auxiliary devices, also fluid operated, acting to prevent roll of the vehicle body in the negotiation of turns and curves.

Conventional vehicles, equipped with metal springs, normally include U-shaped torsion bars extending transversely of the vehicle between the spring assemblies as the means tending to prevent undue body roll. These bars have the same stiffness irrespective of load and hence are maximally effective only at a particular load—an obvious deficiency since any adequate anti-roll contrivance should be maximally effective irrespective of load.

The principal object of the invention is implicit in the foregoing, namely to provide anti-roll means for a vehicle having a suspension system of the type indicated, incorporating fluid-operated anti-roll means, the effectiveness of which does not vary with changes in load. Other objects and features of the invention will become apparent from the following description of a preferred embodiment thereof. The description will proceed with reference to the accompanying drawings wherein, Figure 1 is a perspective view showing the rear portion of a vehicle chassis incorporating the invention;

Figure 2 is a representation, largely diagrammatic, of the pneumatic system including the suspension members and the devices preventing roll.

Referring first to Figure 1, the numerals 10 and 12 denote the side rail components of the vehicle frame, these rails being interconnetced via a cross member 14. Rearward of such member is a support 16 for a bracket 16' through which the propeller shaft 20 and its tubular housing 22 extend. The latter parts terminate at the housing 24 for the usual differential gearing through which the dual road wheels 26 are driven.

Pivoted to the cross member 14 at 28 and 30 are beams or arms 32, 34 interconnected through cross braces 36 and 38 and linked to the frame side rails 10, 12 through shock absorbers 40, which may be of conventional design. The previously mentioned bracket support 16 will be noted as fixed to the arms 32, 34.

Arms 32, 34 near their ends beyond the road wheels will be seen as mounting air bags or bellows 42. Such bags are fixedly secured to the arms, also to the frame side rails and will be referred to hereinafter as the "suspension bags." Just inward of the bags 42 are U-bolts 44, only one pair shown, serving to secure the rear axle housing to the arms 32, 34.

In addition to the bags 42, the suspension system proper comprises a pair of leveling valves 46, only one shown in Fig. 1, whereby the vehicle frame or body is maintined at a constant height with respect to the roadway regardless of variance in the load carried by the vehicle. Each of the leveling valves comprises an arm 48 with a linkage 50 and otherwise may conform in structure and arrangement to the valve disclosed in Rossman Patent 2,670,201. In view of the showing of such patent detailed description of the valve is believed unnecessary here. Suffice it to say, that as the arm 48 is swung upward by downward movement of the frame side rail induced by an increase in load, air is admitted to the associated bag 42 via the valve to compensate for the load increase and conversely when the arm 48 is swung downward on a decrease in the load, air is exhausted from the bag. These changes in the pressure of the air in the suspension bags occur only under static conditions, e. g., when the vehicle is being loaded or unloaded, the leveling valves having a built-in delay preventing their operation on spring deflection due to road irregularities.

Supported by the arms 32, 34 inward of the dual wheels 26 are the means for preventing roll of the vehicle as the same courses a corner or curve. In the embodiment illustrated these means include air bags 52, 52' and 54, 54' acting, respectively in compression and tension. Thus, the bags 52, 52' are secured at their ends to brackets 60 and 62 made fast to the frame side rails and the arms 32, 34, respectively; while the bags 54, 54', on the other hand, are applied in reverse, i. e. each of such bags seats on a bracket 66 fixed to the side rail and is fixedly secured at its top to a saddle 58 forming part of bracket 62. It should be readily seen that whereas the working pressure in the bags 52, 52' acts in a direction tending to further the spacing between the vehicle frame and the pivoted arms, the working pressure in the bags 54, 54' tends to decrease this spacing.

Going now to Figure 2, it will be observed that the left-hand compression bag 52 receives its air supply from the left-hand suspension bag 42, also that the right-hand tension bag 54' is similarly supplied. In view of the conduit 70 air exchange between the bags 52 and 54' can readily occur.

The air supply to the right-hand compression bag 52' and the left-hand tension bag 54 will be noted as being through the right-hand suspension bag 42 and free and open communication between the bags 52' and 54 is provided by conduit 72.

The compressor 74 and storage tank 76, shown in Fig. 2, may be carried on the vehicle in any suitable location. These parts and the air lines are omitted in Figure 1 for clarity of presentation.

With the arrangement as described and illustrated, it should be apparent that with the vehicle in process of negotiating a left turn, for example, any tendency of the vehicle body to roll laterally clockwise is resisted by the increasing pressure of the air in the left-hand tension bag 54, such increase owing to air transferred to the bag 54 via conduit 72 from the right-hand compression bag 52' which incident to the turning collapses to an extent determined by the radius of curvature and the speed of the vehicle. At the same time the left-hand compression bag 52, right-hand tension bag 54', and left-hand suspension bag 42 all tend to expand and, since they form a common system, increase the resistance to roll. On a right turn the action is similar, the air interchange in this case being between the left-hand compression bag 52 and the right-hand tension bag 54'.

In parallel ride motion the displacement of left-hand tension bag 54 cancels the displacement of right-hand compression bag 52' so that the system of bag 54, 52' and right-hand bag 42 is affected only by the displacement of right-hand suspension bag 42. In the same way bag 52 cancels 54', and only left-hand bag 42 is effective.

We claim:

1. In a suspension system for automotive vehicles, a frame, a pair of transversely spaced arms pivotally connected to said frame and extending toward the rear thereof for connection to a rear axle and to shock absorbing means linked to said frame, a suspension air bag between each of said arms and said frame inward of said shock absorbing means and pneumatic anti-roll means disposed inward of said suspension air bags between each arm and said frame, said means including an air bag acting in compression and an air bag acting in tension, each compression bag being interconnected with the tension bag carried by the opposed arm.

2. In a suspension system for automotive vehicles, a frame, a pair of transversely spaced arms pivotally connected to said frame and extending toward the rear thereof for connection to a rear axle and shock absorbing means linked to said frame, a suspension air bag between each of said arms and said frame inward of said shock absorbing means, a source of air pressure carried by the vehicle and pneumatic anti-roll means disposed inward of said suspension air bags between each arm and said frame, said means including in longitudinally-spaced relation an air bag acting in compression and an air bag acting in tension, each compression bag being interconnected with the tension bag carried by the opposed arm, all of said bags being supplied with air from said source, the supply to said compression and tension bags being through said suspension bags.

3. A suspension system as defined by claim 2 wherein the air supply to the right-hand compression bag and the corresponding tension bag carried by the opposed arm is through the right-hand suspension bag and the air supply to the left-hand compression and the opposed tension bag is through the left-hand suspension bag.

4. In a suspension system for automotive vehicles, a frame, a pair of transversely spaced beams extending longitudinally of said frame, each having connection with a member carrying a road wheel or the like, a suspension device between each of said beams and said frame and fluid-controlled anti-roll means disposed between each beam and said frame inwardly of the corresponding wheel or the like, said means including a device acting in compression and a device acting in tension, each compression device being interconnected with the tension device associated with the opposed beam, said suspension devices being fluid-controlled and the compression and tension devices being carried on the beams in longitudinally spaced relation.

5. In a suspension system for automotive vehicles, a frame, a pair of transversely spaced arms pivotally connected to said frame and extending toward the rear thereof for connection to a rear axle, a suspension air bag between each of said arms and said frame, a source of air pressure carried by the vehicle and pneumatic anti-roll means disposed inward of said suspension air bags between each arm and said frame, said means including in longitudinally-spaced relation an air bag acting in compression and an air bag acting in tension, each compression bag being interconnected with the tension bag carried by the opposed arm, all of said bags being supplied with air from said source, the air supply to the right-hand compression bag and the corresponding tension bag carried by the opposed arm is through the right-hand suspension bag and the air supply to the left-hand compression and the opposed tension bag is through the left-hand suspension bag.

References Cited in the file of this patent
UNITED STATES PATENTS

| | | |
|---|---|---|
| 2,115,159 | Dupuy | Apr. 26, 1938 |
| 2,211,650 | Dwight | Aug. 13, 1940 |
| 2,670,201 | Rossman | Feb. 23, 1954 |